US012274271B2

United States Patent
Van Steijn et al.

(10) Patent No.: US 12,274,271 B2
(45) Date of Patent: Apr. 15, 2025

(54) SYSTEM AND METHOD FOR AUTOMATICALLY SUSPENDING POULTRY FROM A CARRIER OF A CONVEYOR

(71) Applicant: Meyn Food Processing Technology B.V., Oostzaan (NL)

(72) Inventors: Aloysius Christianus Van Steijn, Oostzaan (NL); Rick Sebastiaan Van Stralen, Oostzaan (NL); René Gerardus Hendricus Ai, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 18/137,497

(22) Filed: Apr. 21, 2023

(65) Prior Publication Data

US 2023/0337687 A1    Oct. 26, 2023

(30) Foreign Application Priority Data

Apr. 22, 2022  (NL) ...................................... 2031671

(51) Int. Cl.
*A22C 21/00*  (2006.01)
(52) U.S. Cl.
CPC ...... *A22C 21/0046* (2013.01); *A22C 21/0053* (2013.01)
(58) Field of Classification Search
CPC ................. A22C 21/0046; A22C 21/0053

USPC ........................................................ 452/185
See application file for complete search history.

(56) References Cited

U.S. PATENT DOCUMENTS

| 10,881,115 | B1* | 1/2021 | Inscho, Jr. ......... A22C 21/0007 |
| 2019/0297903 | A1* | 10/2019 | Van Der Waal ....... A22B 7/002 |
| 2020/0254641 | A1* | 8/2020 | Hocker ................ B26D 7/1863 |
| 2023/0337687 | A1* | 10/2023 | Van Steijn ......... A22C 21/0053 |

FOREIGN PATENT DOCUMENTS

| JP | 2005 245348 A | 9/2005 |
| WO | WO 2014/040604 A1 | 3/2014 |
| WO | WO 2020/126893 A2 | 6/2020 |

OTHER PUBLICATIONS

NL Search Report, Jan. 20, 2023.

* cited by examiner

*Primary Examiner* — Richard T Price, Jr.
(74) *Attorney, Agent, or Firm* — Dority & Manning, P.A.

(57) ABSTRACT

A system and method for automatically suspending poultry by the legs from a carrier of a carrier conveyor. The system can include an imaging device connected to a decision-making tool to process images from the poultry on a feedline and a vision guided robot for picking up the poultry from a feedline. The poultry can be suspended from the carrier of the carrier conveyor. The decision-making tool can be arranged to detect poultry with the breast engaging the feedline to control the vision guided robot to pick up the poultry from the feedline.

19 Claims, 5 Drawing Sheets

SYSTEM AND METHOD FOR AUTOMATICALLY SUSPENDING POULTRY FROM A CARRIER OF A CONVEYOR

PRIORITY STATEMENT

The present application claims priority under 35 U.S.C § 119 to Dutch patent application No. 2031671, filed on Apr. 22, 2022.

FIELD OF THE INVENTION

The subject matter of the present disclosure relates generally to automatically suspending poultry.

BACKGROUND OF THE INVENTION

JP 2005 245348 discloses a system and method in which poultry is transferred in crates by conveyors towards a nitrogen gas chamber. The killed poultry is from the gas chamber transferred with an exit conveyor to a suspended animation hen placement stand wherein the poultry is monitored by a camera. Depending on the camera grasping the state of the chickens by an image, the poultry is automatically suspended from a hanger conveyer of an automatic chicken slaughter line by using a robot and a loading/transferring device.

WO2014/040604 discloses an apparatus for suspending birds having body, neck, legs and possibly head and feet from an overhead conveyor, including
  a. a plurality of holders each having a neck end adapted from receiving the neck of a bird and a first opening from which the legs and/or feet of the bird may project,
  b. a monitoring station for determining orientation of the legs and/or feet of each bird, and
  c. a rotation station for rotating the bird about an axis of rotation extending between a plane defined by the first opening of the holder and a plane defined by the neck end of the holder.

With the apparatus of WO2014/040604 a method can be applied for suspending birds having body, neck, legs and possibly head and feet from an overhead conveyor, including the following sequence of steps:
  a. each bird is arranged in a holder with its legs and/or feet projecting from a first opening therein and its neck at a neck end of the holder,
  b. orientation of the legs and/or feet is determined,
  c. the bird is rotated about an axis of rotation extending between a plane defined by the first opening of the holder and a plane defined by the neck end of holder until a predetermined orientation of the legs and/or feet is reached, and
  d. the legs and/or feet of the bird are arranged in a shackle on the conveyor.

WO2020/126893 teaches that it is common in the field of pig abattoirs to suspend pieces of meat on a specific transporting means, usually termed a "Christmas tree", for internal or external transport and/or storage. This Christmas tree essentially consists of a number of hooks, mounted on a vertical rod, which rod is configured to be suspended from an overhanging rail or to be mounted on a stand, and makes up a means for collecting and transporting the meat items.

At pig abattoirs, and when dealing with the processing of e.g., fore-ends and bellies of pork, it is customary to sort these meat items into different weight classes, which necessitates division of the starting products into different product lines (waiting spaces) for storage and awaiting the further processing.

WO2020/126893 proposes a system and process in order to avoid the manual hard work associated with suspending large and heavy pig meat pieces, e.g. on racks for storage and/or transport of goods. Accordingly, WO2020/126893 indicates a pig meat handling system, configured for moving and suspending one or more pig meat items from an inlet conveyor to a means for storage and/or transport of the pig meat items. The system includes:
  a. one or more processing means;
  b. an inlet conveyor belt for transporting and providing the meat items to an arrival area;
  c. a sensor, installed at, or within operating distance of the arrival area, for detecting the arrival of the pig meat items at the arrival area;
  d. the processing means being in operation with the inlet conveyor belt, the sensor, and with one or more industrial robots, and/or the storage/transporting means,
  e. means for turning a rod, for determining the exact localisation of the arriving pig meat item, for determining the localisation of a suitable gripping point on the pig meat item;
  f. a gripping tool mounted on the industrial robot, capable of picking, grabbing, clamping or holding the arriving pig meat item while in motion, and lifting it up from the conveyor, so it can finally be hung on the means for storage/transport; which storage/transporting means can include a number of hooks, with the tip facing upwards, for receiving the pig meat items to be stored/transported, and which hooks are mounted on a vertical rod, which rod is operatively connected to a means for turning the said rod, so as to bring the hook into a certain position for receiving the pig meat item, delivered by the gripping tool mounted on the industrial robot.

U.S. Pat. No. 10,881,115 B1 indicates a system and method for automatically suspending poultry by the legs from a carrier of a carrier conveyor, including a feedline for the poultry to be suspended wherein the system includes an imaging device connected to a decision-making tool to process images from the poultry on the feedline received from the imaging device, and a vision guided robot for picking up the poultry from the feedline and suspend the poultry by the legs from the carrier of the carrier conveyor. The system can be provided with a poultry orientation determination system, an orienting system for the poultry, an orienting pass fail system and a poultry shackling system whereby poultry is robotically inserted into a poultry shackle using a plurality of vision guided robots in series and a tool that has a three axis capability of rotation and a contour to match the contour of a poultry breast.

A large disadvantage of this known system and method for automatically suspending poultry from a carrier of a carrier conveyor is that it requires much equipment for its implementation, which makes it expensive and complicated and prone to failure.

BRIEF DESCRIPTION OF THE INVENTION

Aspects and advantages of the invention will be set forth in part in the following description, or may be obvious from the description, or may be learned through practice of the invention.

One exemplary object of the invention to reduce expenses, to improve reliability and make the system and its method of operation simpler and less complicated.

In certain exemplary aspects, a system and method are proposed in accordance with the appended claims, which also cover a computer, computer program and computer readable medium provided with such computer program in support of the method and system of the invention.

In one exemplary embodiment, the present invention can provide a system for automatically suspending poultry by the legs from a carrier of a carrier conveyor. The decision-making tool can be arranged to detect and select poultry with the breast engaging the feedline and to control the vision guided robot to pick up the thus selected poultry from the feedline by engaging the poultry at the legs, and subsequently suspend the poultry by the legs from the carrier of the carrier conveyor.

In a related exemplary aspect of the invention, the decision-making tool can be arranged to detect and select poultry with a position other than the breast engaging the feedline and to control the vision guided robot to move such selected poultry such that the breast will engage the feedline, after which the decision-making tool controls the vision guided robot to pick up the poultry from the feedline by engaging the poultry at the legs, and subsequently suspend the poultry by the legs from the carrier of the carrier conveyor.

Certain exemplary aspects of the invention can include the benefit that by engaging the poultry at the legs only when the breast of the poultry engages the feedline, the position of the legs is well defined since the poultry legs are then always resting on top of the feedline, which avoids the need to detect the height of the legs. Certain embodiments of the invention can further avoid the complicated pass/fail orientation system which is required in the system and method of the prior art, without compromising but even by improving the reliability that is achieved in the process of picking up the poultry from the feedline and thereafter suspending the poultry by the legs in a conveyor line.

In an exemplary method, the present invention may include taking images from the poultry on the feedline, processing the images to detect and select the poultry with the breast engaging the feedline, controlling the vision guided robot to pick up the poultry from the feedline by engaging the poultry at the legs, and controlling the vision guided robot to suspend the poultry by the legs from the carrier of the carrier conveyor.

It may be desirable, in certain exemplary applications, that when the poultry is detected with a position other than its breast engaging the feedline, to control the vision guided robot to move the poultry such that its breast will engage the feedline, and to control thereafter the vision guided robot to engage the poultry by the legs and to suspend the poultry by the legs from the carrier of the carrier conveyor.

Although other exemplary methods are included, in one exemplary aspect at least the processing of images of the poultry and/or the controlling the vision guided robot is implemented using a computer. Correspondingly, exemplary aspects of the invention also include a computer program which when loaded in the computer can arrange that the computer supports an exemplary system of the invention and exemplary methods of operation. In other exemplary aspects, the present invention also includes a computer readable medium provided with such an exemplary computer program of the invention.

To enable processing poultry in large quantities and at a high rate, the feedline may be equipped with a supply station to release a plurality of poultry in a non-organized order to the feedline. It is of course also possible that the feedline receives the poultry in an organized order, which may reduce the burden of afterwards properly orienting the poultry after the poultry is picked up from the feedline by the vision controlled robot and before the vision controlled robot has suspended the poultry from the appropriate carrier of the carrier conveyor.

The supply station can be equipped to receive the poultry one by one, or in containers, such as crates.

The supply station may be equipped to release the poultry from the containers so that they move into and through a transfer portion towards the feedline, wherein the transfer portion is equipped with guiding channels to provide the poultry to the feedline in separate lines or moving queues of poultry. This promotes that the poultry in separate neighbouring lines will not touch each other, which makes imaging of individual birds more easy, and also helps in picking up poultry from the feedline by the vision guided robot. It is preferred that eventually neighbouring poultry on the feedline will not touch each other.

In other exemplary aspects, the invention may include a beneficial feature that the decision-making tool controls the vision guided robot to engage and pick up the poultry from the feedline in an arbitrary orientation, which is particularly beneficial because of the nonorganized order in which the supply station may release the poultry to the feedline. Thereafter the decision-making tool can control the vision guided robot to suspend the picked up poultry by the legs in a predetermined orientation of the picked up poultry with respect to the carrier of the carrier conveyor.

In certain exemplary aspects of the invention, it can be desirable to collect images of the poultry whilst the vision guided robot has picked up the poultry from the feedline and the poultry is hanging from the vision guided robot, and to control the vision guided robot based on images of the poultry hanging from the vision guided robot. The images are provided by an imaging device or devices.

Reliability of the control of the vision guided robot can be improved by arranging that at least one imaging device is mounted on the vision guided robot. This is, however, not essential, the imaging device or devices may also be stand-alone device(s) next to the vision guided robot.

In another exemplary embodiment, a system of the invention can make it possible to suspend the poultry in any desired orientation. In a particular embodiment, however, the predetermined orientation of the poultry is one wherein the poultry breast faces the carrier or one wherein the poultry breast faces away from the carrier. For all practical purposes these options can accommodate the majority of situations in poultry processing plants. One thing and another is preferably achieved by arranging that the decision-making tool selects the predetermined orientation of the poultry depending on the type of the carrier conveyor in which the poultry will or is to be suspended. In most embodiments the poultry will be picked up and suspended from the carrier with the breast facing the carrier. This in particular applies to buffer stations.

The orientation of the breast is determined by detecting a characteristic feature of the poultry, such as the beak.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawings of one or more exemplary embodiments of a system according to the invention that is not limiting as to the appended claims. In the drawings:

FIGS. 4 and 5 show an exemplary system of the invention, wherein

Whenever in the drawings the same reference numerals are applied, these numerals refer to the same parts.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

Figure 1:
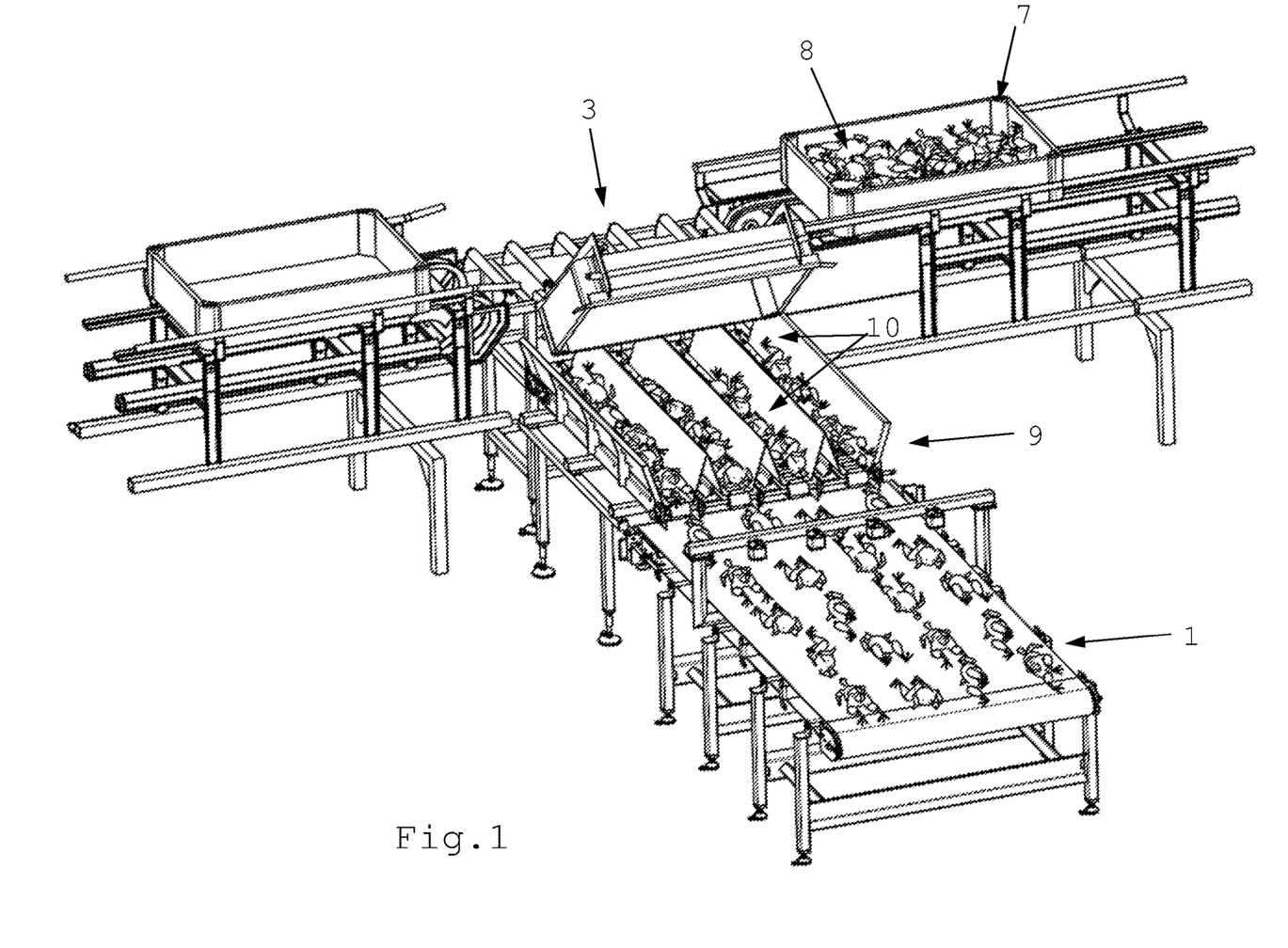
FIG. 1 shows an exemplary supply station and an exemplary feedline forming part of a system according to an exemplary embodiment of the invention.

In exemplary aspects and for purposes of description, the invention includes a system and method for automatically suspending poultry from a carrier of a carrier conveyor. The exemplary system can include several parts, to note a feedline 1 for the poultry 8, which is shown in FIG. 1 together with a supply station 3 for the poultry. Further, the exemplary system can include a vision guided robot 4 and the carrier conveyor 5, which are both shown in FIGS. 2 and 3. The carrier conveyor 5 includes a series of carriers 6, only one of which is shown. The carriers 6 are movable in the conveying direction of the carrier conveyor 5 in a manner that is entirely known to the skilled person and therefore requires no further elucidation.

The feedline 1 receives the poultry 8 from a supply station 3, which receives the poultry 8 for instance in containers 7 and releases the poultry 8 from the containers 7 to the feedline 1. Accordingly, the feedline 1 can receive a plurality of poultry 8 in a non-organized order, preferably without neighbouring poultry received on the feedline 1 touching each other.

The supply station 3 is equipped with a transfer portion 9 to supply the poultry 8 that is released from the containers 7 towards the feedline 1. The transfer portion 9 is equipped with guiding channels 10 to provide the poultry 8 to the feedline 1 in separate lines or moving queues of poultry.

Figure 2:
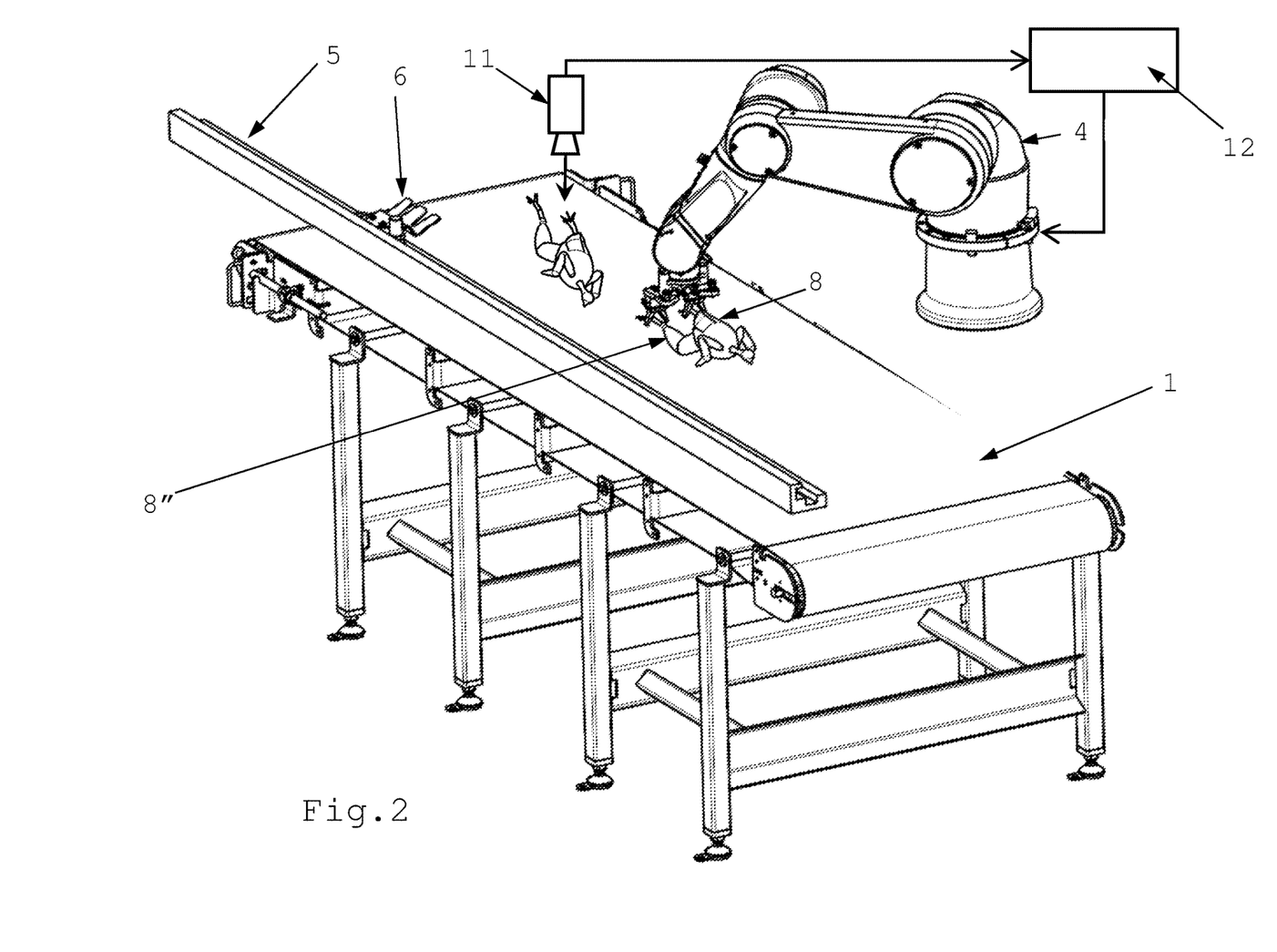
FIGS. 2 and 3 show exemplary systems of the invention with an exemplary feedline, a vision guided robot, and a carrier conveyor, wherein the poultry is supplied on the feedline with the breast engaging the feedline.
Figure 3:
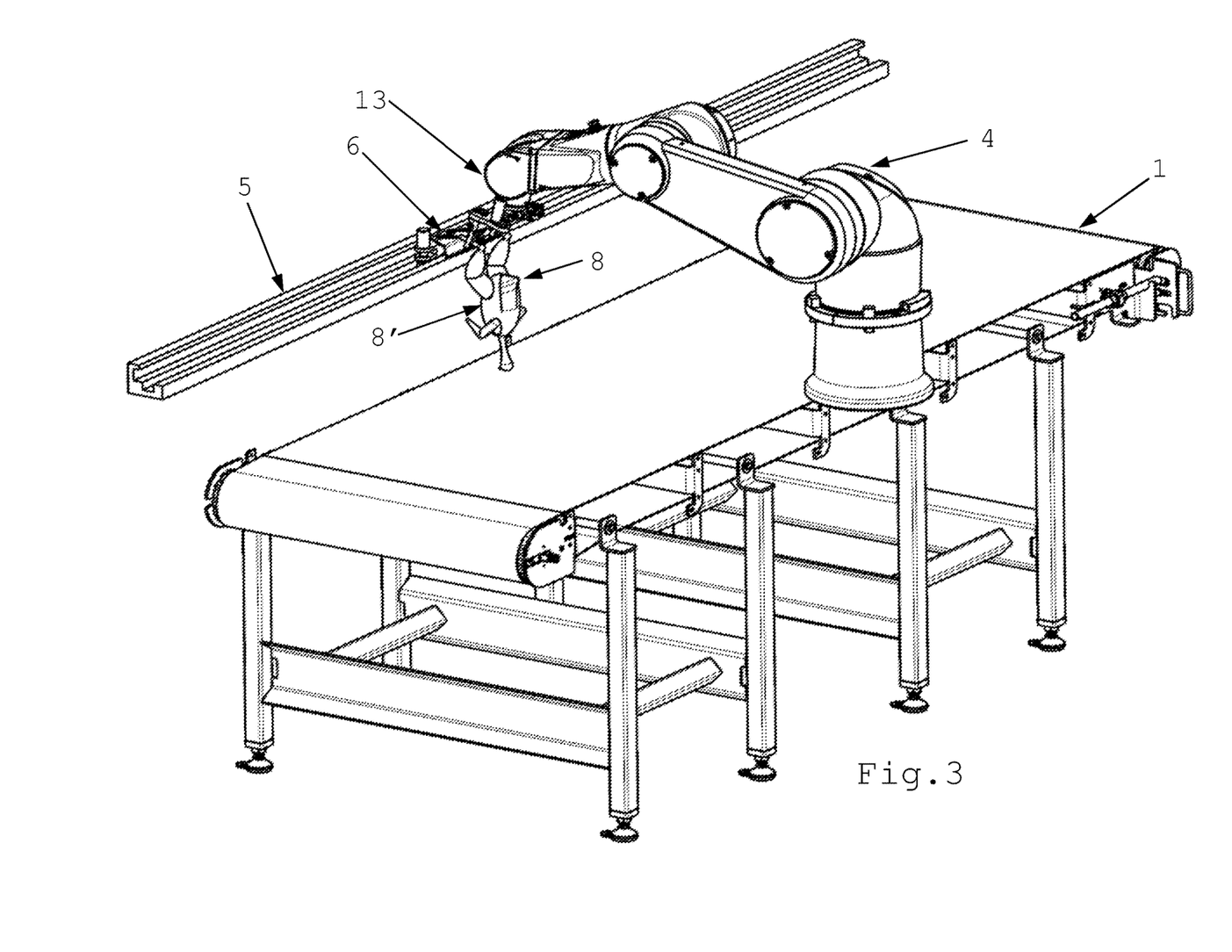
Figure 4:
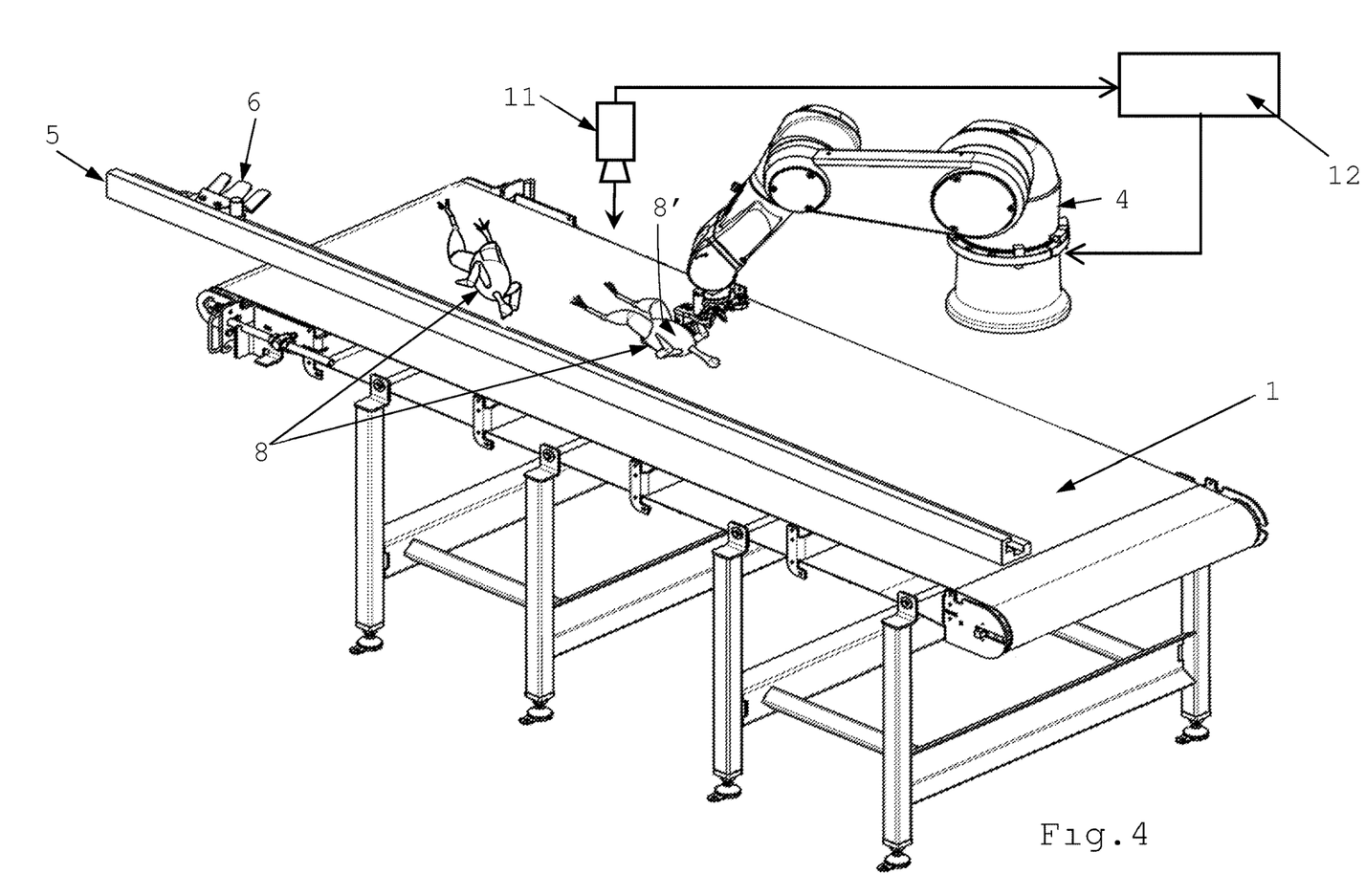
FIG. 4 depicts a situation wherein the poultry engages the feedline with the back.
Figure 5:
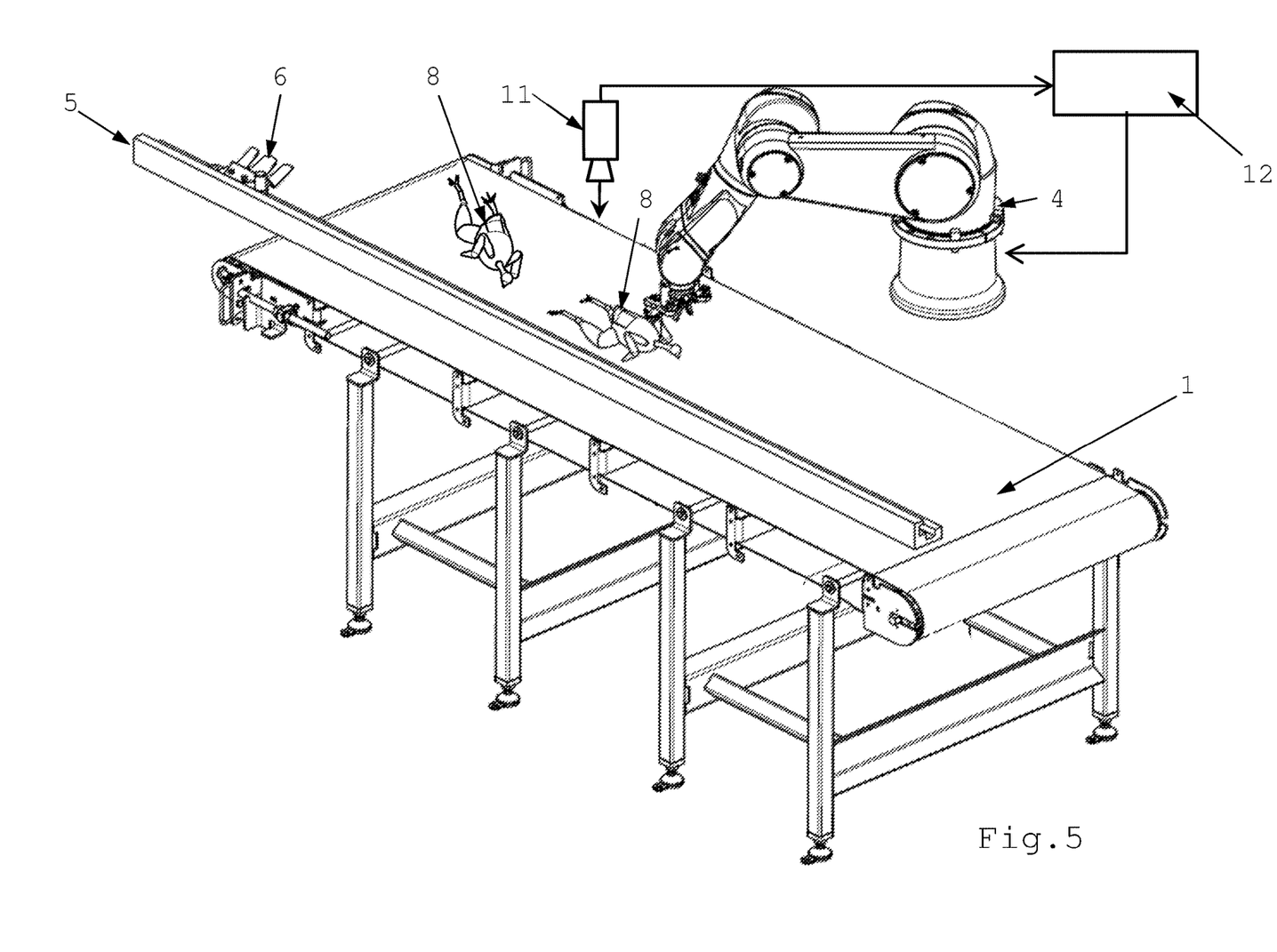
FIG. 5 depicts a situation wherein the poultry engages the feedline with the breast.

For clarity reasons, FIGS. 2 through 5 only show the exemplary feedline 1 wherein FIGS. 2 and 5 show that the poultry 8 is supplied towards a vision guided robot 4 with the breast 8' engaging the feedline 1. In FIG. 4 the situation is depicted that while approaching the vision guided robot 4, the poultry 8 engages the feedline 1 with the back. In this latter situation which can be detected with an imaging device 11, the decision-making tool 12 is arranged to control the vision guided robot 4 to move the poultry 8 such that eventually the breast 8' of such poultry 8 will engage the feedline 1, as is shown in FIGS. 2 and 5.

When the poultry 8 engages the feedline 1 with the breast 8', the decision-making tool 12 controls the vision guided robot 4 to pick up the poultry 8 in an otherwise arbitrary orientation from the feedline 1 by engaging the poultry 8 at the legs 8", and subsequently suspend the poultry 8 by the legs 8" from the carrier 6 of the carrier conveyor 5. The position of the legs 8" when the poultry 8 is engaging the feedline 1 is well defined since the poultry legs 8" are then always resting on top of the feedline 1. FIG. 3 depicts that the vision guided robot 4 can suspend the poultry by the legs 8" from the carrier 6 in a predetermined orientation with respect to the carrier 6.

The decision-making tool 12 controls the vision guided robot 4 based on images of the poultry 8, which images are derived from the stand alone imaging device 11 (see FIG. 2) or an imaging device 13 which is mounted on the vision guided robot 4 (see FIG. 3).

The predetermined orientation of the poultry 8 wherein it will be suspended is one of the poultry breast 8' facing the carrier 6 and the poultry breast 8' facing away from the carrier 6. The first option is shown in FIG. 3. Preferably the orientation of the breast 8' is determined by detecting a characteristic feature of the poultry 8, such as the head, especially the beak. The decision-making tool 12 is arranged to select the predetermined orientation of the poultry 8 usually depending on the type of the carrier conveyor 6 in which the poultry 8 will or is to be suspended.

Turning back to FIG. 2 which shows the imaging device 11 as a standalone device next to the vision guided robot 4, in certain exemplary embodiments it is then required that the imaging device 11 is provided with a tracking feature to follow the poultry 8 after it has been picked up by the vision guided robot 4. Another option is to use a further imaging device 13, which is can be mounted on the vision guided robot 4 as depicted in FIG. 3. This may be particularly advantageous in controlling the movement of the vision guided robot 4 when causing it to accurately suspend the poultry 8 by the legs 8" in the appropriate carrier 6 of the carrier conveyor 5.

Embodiments of the present invention can include every combination of features that are disclosed herein independently from each other. Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. Unless specifically stated as being "essential" above, none of the various components or the interrelationship thereof are essential to the operation of the invention. Rather, desirable results can be achieved by substituting various components and/or reconfiguration of their relationships with one another.

Optionally, embodiments of the present invention can include a general or specific purpose computer or distributed system programmed with computer software implementing steps described above, which computer software may be in any appropriate computer language, including but not limited to C++, FORTRAN, ALGOL, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

The invention claimed is:

1. A system for automatically suspending poultry from a carrier of a carrier conveyor, the poultry having a breast and legs, the system comprising:
    an imaging device;
    a decision-making tool to which the imaging device is connected, wherein the decision-making tool processes images of the poultry suspended on a feedline that are received from the imaging device; and
    a vision-guided robot for picking up the poultry from the feedline and suspending the poultry by the legs from the carrier of the carrier conveyor;
    wherein the decision-making tool is arranged to detect and select the poultry and, when the breast of the selected poultry is engaging the feed-line, to control the vision guided robot to pick up such selected poultry from the feedline by engaging the poultry at the legs and subsequently suspending the poultry by the legs from the carrier of the carrier conveyor.

2. The system of claim 1, wherein the decision-making tool is arranged to detect and select the poultry, and when the breast of the selected poultry is in a position other than the breast engaging the feedline, to control the vision guided robot to move such selected poultry such that the breast will engage the feedline, after which the decision-making tool controls the vision guided robot to pick up the poultry from the feedline by engaging the poultry at the legs, and subsequently suspend the poultry by the legs from the carrier of the carrier conveyor.

3. The system of claim 1, further comprising a supply station for which the feedline is equipped, the supply station configured to release a plurality of poultry in a non-organized order to the feedline.

4. The system of claim 3, wherein the supply station is equipped to receive the poultry, one by one, or in containers such as crates.

5. The system of claim 4, wherein the supply station is equipped to release the poultry into and through a transfer portion to the feedline, wherein the transfer portion is equipped with guiding channels to provide the poultry to the feedline in separate lines or moving queues of poultry and with at least some neighbouring poultry received on the feedline without touching each other.

6. The system of claim 1, wherein the decision-making tool controls the vision guided robot to engage and pick up the poultry from the feedline in an arbitrary orientation.

7. The system of claim 1, wherein the decision-making tool controls the vision guided robot to suspend the picked up poultry by the legs in a predetermined orientation of the picked up poultry with respect to the carrier of the carrier conveyor.

8. The system of claim 1, wherein the decision-making tool controls the vision guided robot based on images of the poultry, which images are derived from the imaging device.

9. The system of claim 1, wherein the imaging device is mounted on the vision guided robot.

10. The system of claim 9, wherein the predetermined orientation of the poultry is one of the poultry breast facing the carrier or the poultry breast facing away from the carrier.

11. The system of claim 10, wherein the orientation of the breast is determined by detecting a characteristic feature of the poultry such as a beak of the poultry.

12. The system of claim 11, wherein the decision-making tool is arranged to select the predetermined orientation of the poultry depending on the type of the carrier conveyor in which the poultry will or is to be suspended.

13. A method for automatically suspending poultry from a carrier of a carrier conveyor, comprising:
    providing poultry in a feedline towards a vision guided robot;
    taking images from the poultry on the feedline;
    picking up the poultry from the feedline with the vision guided robot;
    suspending the poultry with the vision guided robot by the legs from the carrier of the carrier conveyor);
    processing the images to detect and select the poultry with the breast engaging the feed- line;
    controlling the vision guided robot to pick up the selected poultry from the feedline by engaging the poultry at the legs; and
    controlling the vision guided robot to suspend the poultry by the legs from the carrier of the carrier conveyor.

14. The method of claim 13, further comprising:
    processing the images to detect and select the poultry with a position other than the breast engaging the feedline;
    controlling the vision guided robot to move the selected poultry such that the breast will engage the feedline; and
    controlling the vision guided robot to engage the poultry by the legs and to suspend the poultry by the legs from the carrier of the carrier conveyor.

15. The method of claim 13, further comprising supplying a plurality of poultry to the feedline in a non-organized order with at least some neighbouring poultry received on the feedline without touching each other.

16. The method of claim 13, further comprising controlling the vision guided robot to engage and pick up the poultry from the feedline in an arbitrary orientation.

17. The method of claim 13, further comprising controlling the vision guided robot to suspend the picked up poultry by the legs in a predetermined orientation of the picked up poultry with respect to the carrier of the carrier conveyor.

18. The method of claim 17, further comprising selecting the predetermined orientation from the group comprising a first orientation of the poultry with the breast facing the carrier and a second orientation with the poultry breast facing away from the carrier.

19. The method of claim 18, further comprising providing that at least one of the steps of processing of images of the poultry and controlling the vision guided robot is implemented with a computer.

* * * * *